United States Patent Office 3,264,235
Patented August 2, 1966

3,264,235
PROCESS FOR PREPARING SOLUBLE REACTION PRODUCTS OF EPOXY RESINS AND VARNISHES AND PAINT MADE THEREFROM
Edmond Hustinx, Looiersgracht 4, Maastricht, Netherlands
No Drawing. Filed June 1, 1961, Ser. No. 120,855
10 Claims. (Cl. 260—18)

The invention relates to a process for preparing soluble reaction products of epoxy resins and is characterized in that epoxy resins are heated at a temperature of between 100° and 200° C. with precipitated silicates of polyvalent metals, which are obtained by a reaction between solutions of waterglass and a salt of a polyvalent metal, diluted to such an extent that a liquid suspension results and, thereafter, by washing and drying this suspension at a temperature not exceeding 200° C.

The reactivity of the precipitated silicates of polyvalent metals is due to the presence of OH-groups. In this connection, the precipitated silicates have to be dried at a temperature not exceeding 200° C., preferably at about 110° C. At higher temperatures, namely, the OH-groups disappear under development of water. The last remnants of water are removed by annealing at above 1000° C.

The polyvalent metal silicates are then no longer reagents but fillers which, in their best form, are colloidal. In this connection, mention is made of the fact that the use of colloidal silicates, f.i. kaolin and bentonite, as fillers in thermo-hardening molding products based on epoxy resins has been described already (see Netherlands Patent 83,093).

The preparation of reaction products according to the invention proceeds very readily, especially between 180° and 200° C. At the preparation temperature the subject reaction product is liquid to tacky so that it can be cast into forms to produce casts or objects of art upon cooling.

When the reaction between the precipitated, polyvalent metal silicates and epoxy resin is performed in the presence of mono acids, bivalent carboxylic acids, or acid anhydrides, a thermoplastic synthetic substance is formed which is very suitable as a raw material for varnishes and paints. Thus, by dissolving this raw material in a suitable solvent, a well adhering varnish is obtained which dries quickly and, with the known pigments, gives a well adhering and stable paint. Also, by dissolving in linseed oil a beautifully adhering varnish is formed which, with the known siccatives, dries in normal time and, with the known pigments, gives a beautifully glossy paint. The addition of linseed oil can also take place during the preparation of this raw material.

As examples of epoxy resins which can be used are those prepared from epichlorhydrin and diphenylol propane and have the following formula for their structure:

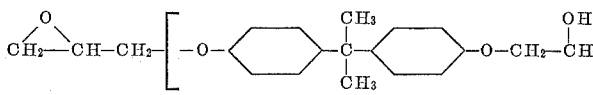 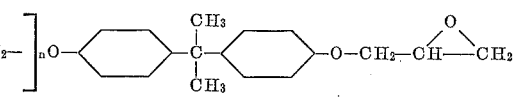

Such resins are sold under the trade name of Epikote resins prepared by Shell Corporation. The melting points are dependent on the degree of polymerization and range from 8–155° C. These resins can be prepared according to the examples and disclosure given in U.S. Patent No. 2,500,449 as well as by other well-known methods.

Metals which can be used are aluminum, calcium, zinc, lead, magnesium, titanium and cobalt.

As examples of carboxylic acids and acid anhydrides, there can be used adipic acid, phthalic acid anhydride, phthalic, and maleic acids, adipic acid anhydride, and maleic acid anhydride. The mono acids which can be used are linseed oil fatty acid and tall oil fatty acid.

The solvents and diluents which can be used include acetone, methyl isobutyl ketone, methyl ethyl ketone, trichlorpropane, butyl acetate, di-isobutyl ketone, methyl oxitol, cyclohexane, rubber solvent, xylene, petroleum hydrocarbons, linseed oil and white spirit (artifical turpentine).

Example I

Two parts of weight of epoxy resin known as Epikote 834 which is liquid at room temperature are mixed with one part by weight of precipitated polyvalent aluminum silicate, which is obtained by a reaction of diluted waterglass with diluted aluminum sulphate and which contains about 20% hydroxyl groups. By heating at above 100° C., ether formation takes place between the OH-groups of the resin and the silicate, whereby the water produced disappears. A synthetic substance of great drawing strength and rigidness is formed.

Example II 40 kilos of epoxy resin known as Epikote 864 having ameltig point of 50° C. are heated with 70 kilos of tall oil fatty acids at about 100° C., thereby slowly adding 30 kilos of precipitated aluminum silicate, 10 kilos of precipitated calcium silicate and 10 kilos of phthalic anhydride. The reagents aluminum silicate and calcium silicate are obtained by a reaction of diluted waterglass with diluted solutions of aluminum sulphate and calcium chloride.

After heating for one hour under development of water at a temperature of 200° C., the reaction is completed. The mixture is cooled to 70° C., and dissolved in twice the quantity by weight of methyl isobutyl ketone, by which a well spreadable and strongly adhering varnish is formed. By evaporation of the solvent after spreading, the varnish dries quickly.

It can be ground with pigments, f.i. colcothar, ochres, titanium white, ultramarine blue, aluminum and zinc powder, to form a durable paint.

If the heated mixture is dissolved in the triple quantity of linseed oil, a varnish is formed which, with the known siccatives, dries in normal time and can be ground also with the above-mentioned pigments. The addition of linseed oil can also take place during or before the heating.

Example III

A mixture of 40 parts of weight of epoxy resin known as Epikote 1004 with a melting point of approximately 100° C., 40 parts of linseed oil fatty acid, 20 parts of precipitated zinc silicate, 20 parts of precipitated lead silicate, 10 parts of precipitated titanium silicate and 10 parts of maleic acid anhydride are heated at 200° C. for two to three hours, then cooled to 110° C. and mixed with the same quantity of white spirit (artificial turpentine).

Example IV

A mixture of 40 kilos epoxy resin known as Epikote 1009 with a melting point of approximately 150° C., 50 kilos of linseed oil, 50 kilos of China-wood oil, 20 kilos of precipitated aluminum silicate, 10 kilos of precipitated titanium silicate, 5 kilos zinc silicate, 500 grams cobalt silicate and 500 grams lead silicate is heated at 220° C.

for two to three hours. After cooling, it can be mixed again with the known pigments.

Obviously many modifications and variations of the present invention are possible in the light of the above teachings. It is, therefore, to be understood that within the scope of the appended claims the invention may be practiced otherwise than as specifically described.

What is claimed is:

1. Process for preparing soluble reaction products of epoxy resins having the formula

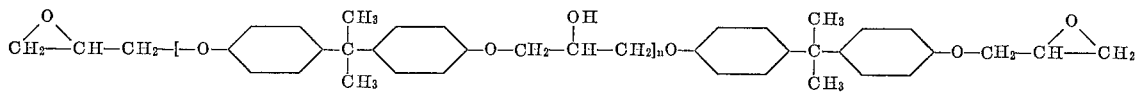

comprising heating epoxy resins of the above formula at a temperature of between 100° and 200° C. with precipitated silicates of polyvalent metals selected from the group consisting of aluminum silicate, calcium silicate, zinc silicate, lead silicate, magnesium silicate, titanium silicate, cobalt silicate and mixtures thereof, said precipitated silicates containing hydroxy groups and the ratio of epoxy resins to precipitated silicates being from 1–2 parts by weight epoxy resins to 1 part by weight silicate.

2. Process according to claim 1 wherein carboxylic acids selected from the group consisting of adipic acid, phthalic acid, maleic acid, linseed oil fatty acid and tall oil fatty acid are incorporated with said epoxy resins and silicates prior to said heating step.

3. Process according to claim 2 wherein the reaction product is dissolved in volatile solvents selected from the group consisting of acetone, methyl isobutyl ketone, methyl ethyl ketone, trichlorpropane, butyl acetate, di-isobutyl ketone, methyl oxitol, cyclohexane, xylene, petroleum hydrocarbons, linseed oil and white spirit to form a varnish.

4. Process according to claim 3 wherein pigments selected from the group consisting of colcothar, ochres, titanium white, ultramarine blue, aluminum and zinc powder are incorporated with the dissolved reaction product to form a paint.

5. Process according to claim 1 wherein carboxylic acids selected from the group consisting of adipic acid, phthalic acid, maleic acid, linseed oil fatty acid and tall oil fatty acid are incorporated with the epoxy resins and silicates during said heating step.

6. Process according to claim 1 wherein anhydrides of carboxylic acids selected from the group consisting of adipic acid anhydride, maleic acid anhydride and phthalic acid anhydride are incorporated with the epoxy resins and silicates prior to said heating step.

7. Process according to claim 1 wherein anhydrides of carboxylic acids selected from the group consisting of adipic acid anhydride, maleic acid anhydride and phthalic acid anhydride are incorporated with the epoxy resins and silicates during said heating step.

8. A soluble reaction product obtained by the method of claim 1.

9. A varnish comprising a soluble reaction product obtained by the method of claim 1 and a volatile solvent selected from the group consisting of acetone, methyl isobutyl ketone, methyl ethyl ketone, trichlorpropane, butyl acetate, diisobutyl ketone, methyl oxitol, cyclohexane, xylene, petroleum hydrocarbons, linseed oil and white spirit.

10. A paint comprising a soluble reaction product obtained by the method of claim 1, a volatile solvent selected from the group consisting of acetone, methyl isobutyl ketone, methyl ethyl ketone, trichlorpropane, butyl acetate, di-isobutyl ketone, methyl oxitol, cyclohexane, xylene, petroleum hydrocarbons, linseed oil and white spirit, and a pigment selected from the group consisting of colcothar, ochres, titanium white, ultramarine blue, aluminum and zinc powder.

References Cited by the Examiner

UNITED STATES PATENTS

| | | | |
|---|---|---|---|
| 2,717,246 | 9/1955 | Kienle et al. | 260—18 XR |
| 2,843,560 | 7/1958 | Mika | 260—18 XR |
| 2,897,733 | 8/1959 | Shuger | 260—37 |
| 3,018,260 | 1/1962 | Creighton | 260—18 |
| 3,036,023 | 5/1962 | Rogers et al. | 260—37 |
| 3,072,606 | 1/1963 | Zuppinger et al. | 260—37 |
| 3,102,823 | 9/1963 | Manasia et al. | 260—37 |

FOREIGN PATENTS 748,441   5/1956   Great Britain.

LEON J. BERCOVITZ, *Primary Examiner.*

MILTON STERMAN, JAMES A. SEIDLECK,
*Examiners.*

T. D. KERWIN, R.W. GRIFFIN, *Assistant Examiners.*